United States Patent
Nukushina

(10) Patent No.: US 9,902,208 B2
(45) Date of Patent: Feb. 27, 2018

(54) PNEUMATIC TIRE

(71) Applicant: The Yokohama Rubber Co., LTD., Minato-ku, Tokyo (JP)

(72) Inventor: Ryosuke Nukushina, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/916,957

(22) PCT Filed: Aug. 26, 2014

(86) PCT No.: PCT/JP2014/072273
§ 371 (c)(1),
(2) Date: Mar. 4, 2016

(87) PCT Pub. No.: WO2015/033818
PCT Pub. Date: Mar. 12, 2015

(65) Prior Publication Data
US 2016/0207359 A1    Jul. 21, 2016

(30) Foreign Application Priority Data

Sep. 4, 2013 (JP) ................................. 2013-183325

(51) Int. Cl.
*B60C 11/04* (2006.01)
*B60C 11/03* (2006.01)
(Continued)

(52) U.S. Cl.
CPC ...... *B60C 11/0327* (2013.01); *B60C 11/0302* (2013.01); *B60C 11/032* (2013.01);
(Continued)

(58) Field of Classification Search
CPC ......... B60C 11/0302; B60C 2011/0381; B60C 11/04; B60C 11/1392; B60C 11/0381
(Continued)

(56) References Cited

U.S. PATENT DOCUMENTS

| 5,785,780 A * | 7/1998 | Ochi ................... B60C 11/0302 152/209.18 |
| 6,371,180 B1 | 4/2002 | Hayashi |
| 8,210,222 B2 * | 7/2012 | Kishizoe ............. B60C 11/0306 152/209.8 |
| 2006/0254684 A1* | 11/2006 | Tamura ............... B60C 11/0306 152/209.18 |
| 2010/0224296 A1* | 9/2010 | Dobashi .............. B60C 11/1392 152/209.18 |

(Continued)

FOREIGN PATENT DOCUMENTS

| JP | H06-0199109 | 7/1994 |
| JP | 2000-043514 | 2/2000 |

(Continued)

OTHER PUBLICATIONS

English machine translation of JP2003-146018, no date.*

(Continued)

*Primary Examiner* — Robert C Dye
(74) *Attorney, Agent, or Firm* — Thorpe North & Western

(57) ABSTRACT

A pneumatic tire is provided with a tread, a pair of sidewalls, and a pair of beads. A plurality of bending grooves are provided in an intermediate land located on the inner side of each shoulder main groove. Each of the bending grooves has one end portion opening to the shoulder main groove and the other end closed in the intermediate land. Each of the bending grooves is composed of a first tilting groove portion extending from the opening end portion to the bending portion and a second tilting groove portion extending from the bending portion to the closed end portion. The direction oriented from the opening end portion of the first tilting groove portion toward the bending portion coincides with the rotational direction, and the second tilting groove portion is bent toward the first tilting groove portion with the bending portion serving as an apex.

16 Claims, 5 Drawing Sheets

(51) Int. Cl.
  *B60C 11/13* (2006.01)
  *B60C 11/12* (2006.01)
  *B60C 13/00* (2006.01)
  *B60C 15/00* (2006.01)
(52) U.S. Cl.
  CPC ............ *B60C 11/04* (2013.01); *B60C 11/045* (2013.01); *B60C 11/1236* (2013.01); *B60C 11/1307* (2013.01); *B60C 11/1392* (2013.01); *B60C 13/00* (2013.01); *B60C 15/00* (2013.01); *B60C 2011/039* (2013.01); *B60C 2011/0334* (2013.01); *B60C 2011/0341* (2013.01); *B60C 2011/0346* (2013.01); *B60C 2011/0365* (2013.01); *B60C 2011/0367* (2013.01); *B60C 2011/0369* (2013.01); *B60C 2011/0372* (2013.01); *B60C 2011/0376* (2013.01); *B60C 2011/0379* (2013.01); *B60C 2011/0381* (2013.01); *B60C 2011/0388* (2013.01); *B60C 2011/1209* (2013.01); *B60C 2011/133* (2013.01)
(58) Field of Classification Search
  USPC ..................................... D12/551; 152/209.28
  See application file for complete search history.

(56) References Cited

U.S. PATENT DOCUMENTS

2012/0285591 A1* 11/2012 Nagayasu ........... B60C 11/1236
                                                        152/209.8

FOREIGN PATENT DOCUMENTS

| JP | 2000-229506 | 8/2000 |
| JP | 2003-146018 | 5/2003 |
| JP | 2005-161921 | 6/2005 |
| JP | 2005-231430 | 9/2005 |
| JP | 2006-123706 | 5/2006 |
| JP | 2008-094140 | 4/2008 |
| JP | 2010-047134 | 3/2010 |
| JP | 2012-171479 | 9/2012 |

OTHER PUBLICATIONS

English machine translation of JP2005-161921, no date.*
International Search Report for International Application No. PCT/JP2014/072273 dated Nov. 25, 2014, 4 pages, Japan.

* cited by examiner

PNEUMATIC TIRE

TECHNICAL FIELD

The present technology relates to a pneumatic tire having a directional tread pattern, and more particularly, to a pneumatic tire that achieves both suppression of uneven wear during circuit driving and prevention of worsening of noise after wear.

BACKGROUND ART

Pneumatic tires are known which have a designated rotational direction and a directional tread pattern corresponding to the rotational direction (see, for example, Japanese Unexamined Patent Application Publication Nos. 2000-229506A and 2005-231430A). In these pneumatic tires, a plurality of main grooves extending in the tire circumferential direction are provided in a tread. A plurality of lands extending in the tire circumferential direction are defined by the main grooves. A plurality of lug grooves extending in the tire width direction are formed in each of the lands. The lug grooves extending from the outer side in the tire width direction toward the inner side are arranged to tilt in the same direction as the rotational direction. Also, in order to ensure rigidity of the lands in which the lug grooves are provided, the end portion of each of the lug grooves on the outer side in the tire width direction opens to one of the main grooves, while the other end portion on the inner side in the tire width direction is closed in one of the lands.

The pneumatic tires having such a directional tread pattern naturally exhibits excellent drainage. The tilt of the lug grooves with respect to the tire width direction enables a pattern noise caused by the lug grooves to be reduced. Furthermore, this configuration has the advantage of exhibiting excellent steering stability, given that the lug grooves are closed at one end, thus ensuring sufficient rigidity of the lands. As such, these pneumatic tires are used as normal tires on local roads, and are also used as-is for circuit driving in competition facilities.

However, in a case where the pneumatic tire having the directional tread pattern that includes the lug grooves closed at one end as described above is used for circuit driving, the rigidity of the portions where the closed end portions of the lug grooves are disposed is relatively low; thus, these portions locally escape from wear due to great deformation during cornering, and conversely, the rigidity of the portions where the closed end portions of the lug grooves are not disposed is relatively high; thus, these portions preferentially undergo wear. As a result, uneven wear over the tire circumference is likely to occur. Then, as uneven wear occurs in the tread, noise after the wear is remarkably worsened. This worsening of noise may not be a problem during circuit driving, but is a cause of loss of comfort during driving on local roads.

SUMMARY

The present technology provides a pneumatic tire that achieves both suppression of uneven wear during circuit driving and prevention of worsening of noise after wear.

A pneumatic tire of the present technology includes a tread extending in the tire circumferential direction and forming an annular shape, a pair of sidewalls disposed on both sides of the tread, and a pair of beads disposed on the inner side of both of the sidewalls in the tire radial direction. In such a tire, the tread has a rib pattern that includes at least four main grooves extending in the tire circumferential direction, the at least four main grooves including a pair of center main grooves and a pair of shoulder main grooves, and at least five rows of lands extending in the tire circumferential direction, the at least five rows of lands being defined by the at least four main grooves, and a rotational direction of the pneumatic tire is designated. Furthermore, a plurality of bending grooves each having a bent shape are provided in an intermediate land located on the inner side of each of the shoulder main grooves. Each of the bending grooves has one end portion thereof opening to one of the shoulder main grooves and has the other end portion closed in one of the intermediate lands. A first tilting groove portion, extending from the opening end portion to the bending portion, and a second tilting groove portion, extending from the bending portion to the closed end portion, are formed in each of the bending grooves. A direction oriented from the opening end portion toward the bending portion of the first tilting groove portion coincides with the rotational direction. The second tilting groove portion is bent toward the first tilting groove portion, with the bending portion serving as an apex.

In the present technology, a pneumatic tire having a designated rotational direction is configured as follows. The plurality of bending grooves each having a bent shape are provided in the intermediate land located on the inner side of each of the shoulder main grooves, rather than typical tilting lug grooves that are closed at one end. Each of the bending grooves has one end portion opening to one of the shoulder main grooves and the other end portion closed in one of the intermediate lands. The first tilting groove portion, extending from the opening end portion to the bending portion, and the second tilting groove portion, extending from the bending portion to the closed end portion, are formed in each of the bending grooves. The direction oriented from the opening end portion toward the bending portion of the first tilting groove portion coincides with the rotational direction. The second tilting groove portion is bent toward the first tilting groove portion, with the bending portion serving as an apex. This configuration allows the closed end portion of each of the bending grooves to be positioned separated from the edge of each of the intermediate lands, thereby achieving both suppression of uneven wear during circuit driving and prevention of worsening of noise after wear.

In the present technology, an average tilt angle α of the first tilting groove portion with respect to the tire circumferential direction is preferably set within a range of from 10° to 30°. Accordingly, a sufficient noise reduction effect may be produced without decreasing uneven wear resistance. Also, an average tilt angle β of the second tilting groove portion with respect to the first tilting groove portion is preferably set within a range of from 5° to 60°. Accordingly a decrease in uneven wear resistance may be avoided.

It is preferable that the groove width of the first tilting groove portion be constant or gradually decrease from the opening end portion toward the bending portion. Similarly, it is preferable that the groove depth of the first tilting groove portion be constant or gradually decrease from the opening end portion toward the bending portion. This enables land rigidity to be sufficiently maintained in the vicinity of the bending portion, and enables uneven wear to be suppressed.

It is preferable that the groove width of the second tilting groove portion be constant from the bending portion toward the closed end portion. Similarly, it is preferable that the groove depth of the second tilting groove portion be constant from the bending portion toward the closed end portion.

Accordingly, a change in rigidity is suppressed in the vicinity of the second tilting groove portion, thus enabling uneven wear to be suppressed.

It is preferable that the distance in the tire width direction from the edge of each of the intermediate lands on the tire equator side to the apex of the bending portion of each of the bending grooves be set within a range of from 5% to 40% of the width of the intermediate land. It is also preferable that the distance in the tire width direction from the edge of each of the intermediate lands on the tire equator side to the apex of the closed end portion of each of the bending grooves be set within a range of from 30% to 70% of the width of the intermediate lands. This enables an uneven wear suppression effect to be sufficiently achieved.

It is preferable that a plurality of sipes extending between the center main grooves and the first tilting groove portion be provided in each of the intermediate lands and that at least one of the sipes be provided for each first tilting groove portion. It is also preferable that a plurality of sipes extending between the shoulder main grooves and the closed end portion of the second tilting groove portion be provided in each of the intermediate lands. Disposing the sipes at these positions provides an effect of averaging the rigidity of the intermediate lands over the tire circumference, and enables improvements to the uneven wear suppression effect. In such a case, it is preferable that the groove depth of the sipes be set within a range of from 20% to 80% of the groove depth of the center main grooves. This enables the rigidity of the intermediate lands to be appropriately adjusted.

It is preferable that a plurality of lug grooves extending in the tire width direction be provided in each of the shoulder lands located on the outer side of each of the shoulder main grooves and that a ratio of the number of the bending grooves to the number of the lug grooves on the tire circumference be 1:2. Accordingly, the rigidity of the shoulder lands is averaged over the tire circumference, thus enabling uneven wear to be suppressed in the shoulder lands.

It is also preferable that all of the lug grooves disposed in the shoulder lands be non-continuous with the shoulder main grooves. Accordingly, block portions defined by the lug grooves in the shoulder lands are thus prevented from collapsing in the tire circumferential direction, thus enabling heel-and-toe wear to be suppressed.

Furthermore, it is preferable that chamfered portions having a zigzag shape be formed on the edges of the intermediate lands and the shoulder lands located on both sides of the shoulder main grooves. The number of the chamfered portions formed on each of the lands preferably equals to the number of the bending grooves. Also, the groove depth of the chamfered portions is preferably set within a range of from 30% to 70% of the groove depth of the shoulder main grooves. Accordingly, the rigidity of the intermediate lands and the rigidity of the shoulder lands are averaged over the tire circumference, thus enabling uneven wear to be suppressed in the intermediate lands and the shoulder lands.

DETAILED DESCRIPTION

A detailed description of the configuration of the present technology is given below, with reference to the accompanying drawings. FIGS. 1 to 6 illustrate a pneumatic tire according to an embodiment of the present technology. The pneumatic tire of the present embodiment is a tire having a designated rotational direction R. The rotational direction R is, for example, indicated on the sidewall of the tire.

Figure 1:
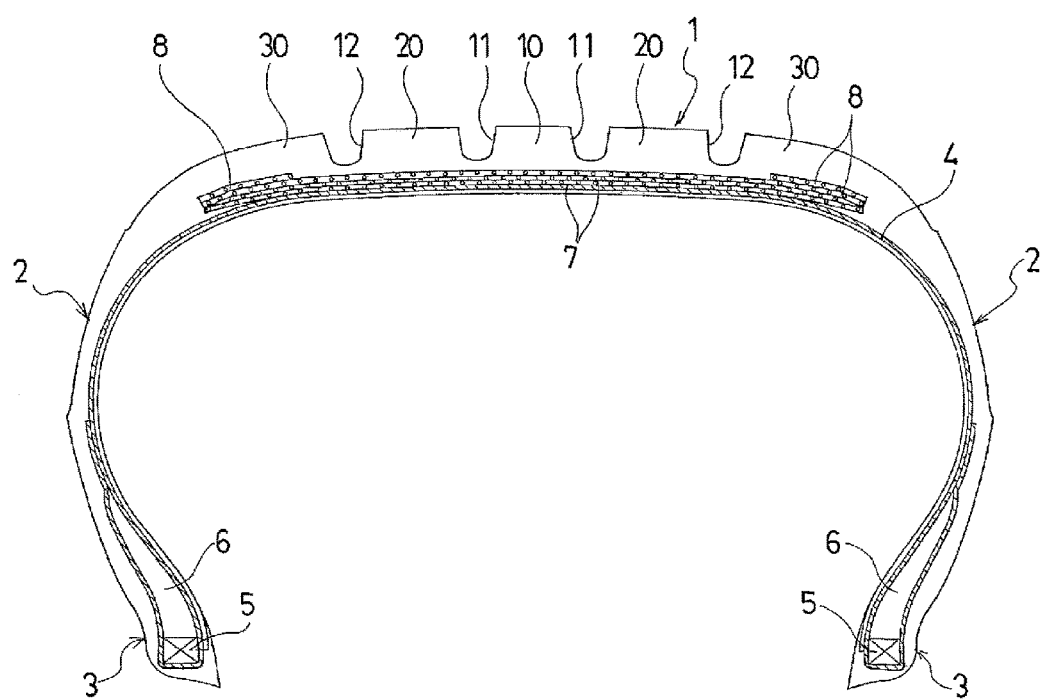
FIG. 1 is a meridian cross-sectional view of a pneumatic tire according to an embodiment of the present technology.

As illustrated in FIG. 1, the pneumatic tire of the present embodiment includes a tread 1 extending in the tire circumferential direction and forming an annular shape, a pair of sidewalls 2, 2 disposed on both sides of the tread 1, and a pair of beads 3, 3 disposed on the inner side of both of the sidewalls 2 in the tire radial direction.

A carcass layer 4 is laid across the pair of beads 3, 3. The carcass layer 4 including a plurality of reinforcing cords that extend in the tire radial direction is folded back, from the tire inner side to the tire outer side, around a bead core 5 disposed in each of the beads 3. A bead filler 6, which is formed of a triangular cross-sectional rubber composition, is disposed on the periphery of the bead core 5.

A plurality of belt layers 7 are embedded on the outer circumferential side of the carcass layer 4 in the tread 1. The belt layers 7 each include a plurality of reinforcing cords that are tilted with respect to the tire circumferential direction, the respective reinforcing cords of the belt layers 7 being disposed so as to intersect each other. In the belt layers 7, the tilt angle of the reinforcing cords with respect to the tire circumferential direction is set within a range of from 10° to 40°, for example. Steel cords are preferably used as the reinforcing cords of the belt layers 7. For the purpose of enhancing high-speed durability, at least one belt cover layer 8 is disposed on the outer circumferential side of the belt layers 7. The belt cover layer 8 includes reinforcing cords arranged at an angle of, for example, not more than 5° with respect to the tire circumferential direction. Organic fiber cords, such as Nylon fiber cords or aramid fiber cords, are preferably used as the reinforcing cords of the belt cover layer 8.

Here, the above-described tire internal structure is a representative example of the pneumatic tire. However, no such limitation is intended. For example, the layer number and layer structure of the carcass layer 4, the belt layer 7, and the belt cover layer 8 may be appropriately changed in accordance with required tire characteristics.

Figure 2:
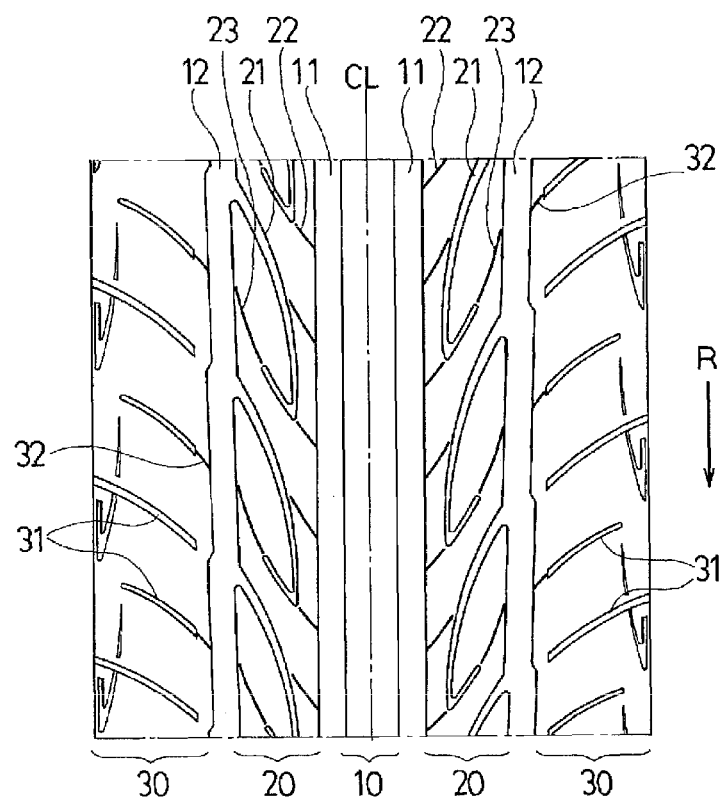
FIG. 2 is a development view, illustrating a tread pattern, of the pneumatic tire according to the embodiment of the present technology.

As illustrated in FIG. 2, a pair of center main grooves 11, extending in the tire circumferential direction at respective positions on both sides of a tire equator CL, and a pair of shoulder main grooves 12, extending in the tire circumferential direction at respective positions further outward in the tire width direction than the center main grooves 11, are formed in the tread 1. The main grooves 11, 12 are not particularly limited in terms of dimensions. For example, their respective groove widths as measured in the tire width direction may be set within a range of from 5.0 mm to 15.0 mm, and their respective groove depths may be set within a range of from 5.0 mm to 15.0 mm.

As a result, a center land 10 extending in the tire circumferential direction is defined between the pair of the center main grooves 11, 11. Intermediate lands 20 extending in the tire circumferential direction are each defined between the center main groove 11 and the shoulder main groove 12. Further, shoulder lands 30 are each defined on the outer side in the tire width direction of the shoulder main groove 12. In the present embodiment, no grooves are formed in the center land 10. However, a notch or sipe may be provided in the center land 10.

Figure 3:
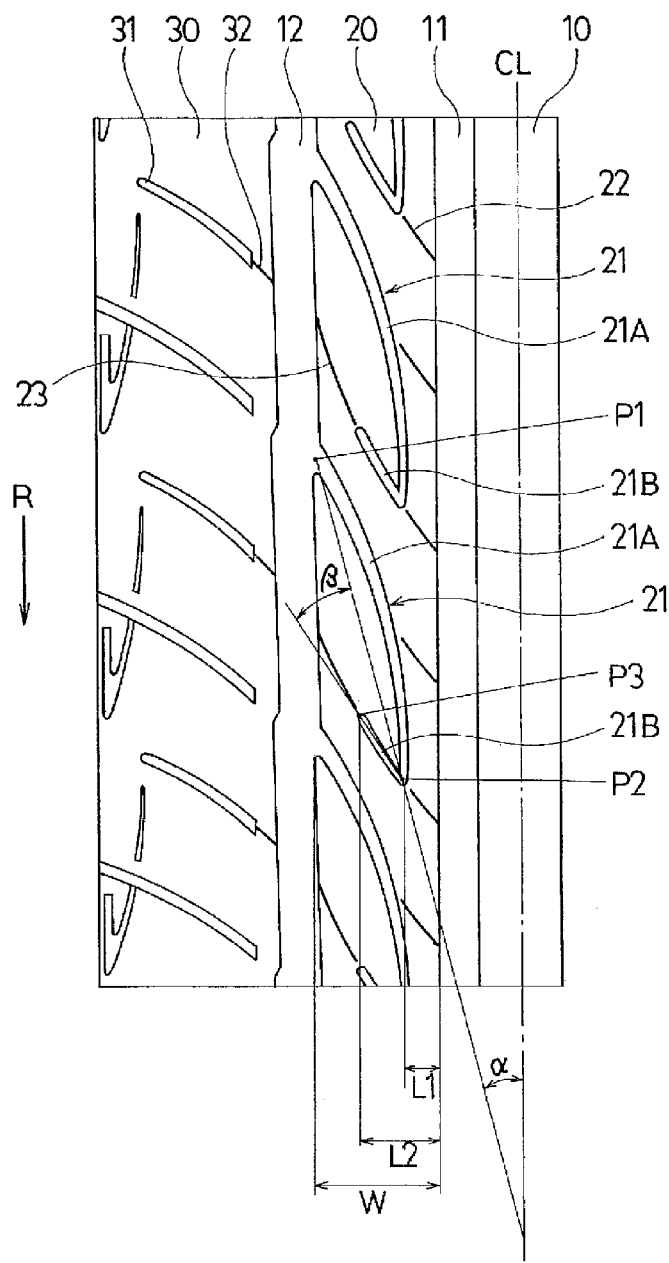
FIG. 3 is a plan view of a main portion of the tread pattern of FIG. 2.

A plurality of bending grooves 21, each having a bent shape, are provided in each of the intermediate lands 20, with spacing in the tire circumferential direction. The bending grooves 21 are bent into a hook shape. Each of the bending grooves 21 has one end thereof opening to the shoulder main groove 12 and the other end closed in the intermediate land 20. As illustrated in FIG. 3, each of the bending grooves 21 includes a first tilting groove portion 21A extending from an opening end portion P1 to a bending portion P2, and a second tilting groove portion 21B extending from the bending portion P2 to a closed end portion P3. A direction oriented from the opening end portion P1 toward the bending portion P2 of the first tilting groove portion 21A coincides with the rotational direction R. Also, the second tilting groove portion 21B is bent toward the first tilting groove portion 21A, with the bending portion P2 serving as an apex.

Furthermore, a plurality of sipes 22 are provided in each of the intermediate lands 20, each extending between the center main groove 11 and the first tilting groove portion 21A. Two of the sipes 22 are disposed for each first tilting groove portion 21A. Specifically, one of the two sipes 22 is disposed between the center main groove 11 and the tip portion of the first tilting groove portion 21A (the bending portion P2), and the other of the two sipes 22 is disposed between the center main groove 11 and the midportion of the first tilting groove portion 21A. These sipes 22 need not necessarily be continuous with the center main grooves 11 and the first tilting groove portions 21A, provided that the sipes 22 extend to the vicinity thereof. Also, a plurality of sipes 23 are provided in each of the intermediate lands 20, each extending between the shoulder main groove 12 and the closed end portion P3 of the second tilting groove portion 21B. The sipes 23 need not necessarily be continuous with the shoulder main grooves 12 and the second tilting groove portions 21B, provided that the sipes 23 extend to the vicinity thereof. Here, the vicinity signifies a region at a distance of not more than 3.0 mm from a relevant groove. The respective groove widths of the sipes 22, 23 are not more than 2.0 mm. The sipes 22, 23 are formed with a fixed groove width irrespective of the pitch length of the tread pattern. The sipes 22, 23 having these dimensions produce edge effects without harming the unity of the intermediate lands 20.

A plurality of lug grooves 31 extending in the tire width direction are provided in each of the shoulder lands 30, with spacing in the tire circumferential direction. All of the lug grooves 31 disposed in the shoulder lands 30 are non-continuous with respect to the shoulder main grooves 12. Also, a plurality of sipes 32 extending between the shoulder main groove 12 and the lug groove 31 are formed in each of the shoulder lands 30. The groove width of the sipes 32 is not more than 2.0 mm, similarly to the sipes 22, 23.

The center land 10, the intermediate lands 20, and the shoulder lands 30 described above each have a rib structure extending continuously in the tire circumferential direction, without being divided by any grooves. A rib pattern formed by the lands 10, 20, 30 each having such a rib structure is advantageous in terms of steering stability. Here, the sipes 22, 23, 32 are formed in the lands 20, 30. However, the sipes 22, 23, 32 do not substantially divide the lands 20, 30.

The pneumatic tire described above has a directional tread pattern having the designated rotational direction R. In such a directional tread pattern, the plurality of bending grooves 21 each having the bent shape are provided in each of the intermediate lands 20 located on the inner side of each of the shoulder main grooves 12. Each of the bending grooves 21 has one end portion thereof opening to the shoulder main groove 12 and has the other end portion closed in the intermediate land 20. The first tilting groove portion 21A, extending from the opening end portion P1 to the bending portion P2, and the second tilting groove portion 21B, extending from the bending portion P2 to the closed end portion P3, are formed in each of the bending grooves 21. A direction oriented from the opening end portion P1 toward the bending portion P2 of the first tilting groove portion 21A coincides with the rotational direction R. The second tilting groove portion 21B is bent toward the first tilting groove portion 21A, with the bending portion P2 serving as an apex. Given this structure, the closed end portion P3 of each of the bending grooves 21 is disposed at a position separated from the edge of the intermediate land 20. Upon applying a great lateral force to the intermediate lands 20 during cornering while circuit driving, this configuration prevents the intermediate lands 20 from undergoing localized deformation in the vicinity of the closed end portions P3 of the bending grooves 21. This enables uneven wear to be suppressed. Also, averaging the wear of the intermediate lands 20 over the tire circumference enables prevention of worsening of noise after wear.

In the above-described pneumatic tire, the average tilt angle α of the first tilting groove portion 21A with respect to the tire circumferential direction (the tire equator CL) is preferably set within a range of from 10° to 30°. The average tilt angle α is a tilt angle of a straight line passing through the respective midpoints in the groove width direction of both the end portions of the first tilting groove portion 21A, with respect to the tire circumferential direction. Setting the average tilt angle α within the above-described range enables a sufficient noise reduction effect to be produced without decreasing the uneven wear resistance. Here, having the average tilt angle α be less than 10° lowers the rigidity of the intermediate lands 20 in the vicinity of the opening end portion P1 of the first tilting groove portion 21A, and thus decreases the uneven wear resistance. Conversely, having the average tilt angle α exceed 30° raises pattern noise and lowers the noise reduction effect.

Also, the average tilt angle β of the second tilting groove portion 21B with respect to the first tilting groove portion 21B is preferably set within a range of from 5° to 60°. The average tilt angle β is a tilt angle of a straight line passing through the respective midpoints in the groove width direction of both the end portions of the second tilting groove portion 21B with respect to the straight line passing through the respective midpoints in the groove width direction of both the end portions of the first tilting groove portion 21A. Setting the average tilt angle β within the above-described range enables a decrease in uneven wear resistance to be avoided. Here, having the average tilt angle β be less than 5° lowers the rigidity of a portion between the first tilting groove portion 21A and the second tilting groove portion 21B, thereby decreasing the uneven wear resistance. Conversely, having the average tilt angle β exceed 60° lowers the rigidity of a portion between the second tilting groove portion 21B and the first tilting groove portion 21A of an adjacent bending groove 21, thereby decreasing the uneven wear resistance.

Figure 4:
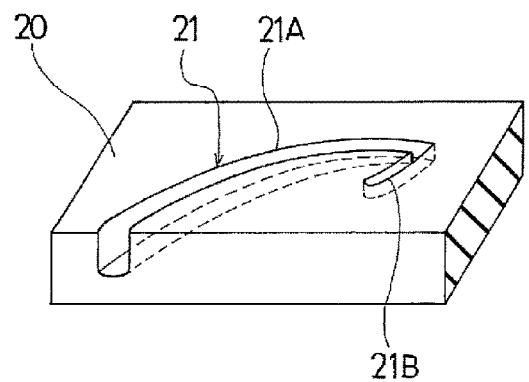
FIG. 4 is a perspective view of an intermediate land having a bending groove.

In the above-described pneumatic tire, it is preferable that the groove width of the first tilting groove portion 21A be constant or gradually decrease from the opening end portion P1 toward the bending portion P2. Specifically, as illustrated in FIG. 3, it is more preferable that the groove width gradually decrease from the opening end portion P1 toward the bending portion P2. Similarly, it is preferable that the groove depth of the first tilting groove portion 21A be constant or gradually decrease from the opening end portion P1 toward the bending portion P2. Specifically, as illustrated in FIG. 4, it is more preferable that the groove depth gradually decrease from the opening end portion P1 toward the bending portion P2. This enables land rigidity to be sufficiently maintained in the vicinity of the bending portion P2, and enables uneven wear to be suppressed.

Also, the groove width of the second tilting groove portion 21B is constant from the bending portion P2 toward the closed end portion P3, as illustrated in FIG. 3. Similarly, the groove depth of the second tilting groove portion 21B is constant from the bending portion P2 toward the closed end portion P3, as illustrated in FIG. 4. Accordingly, a change in rigidity is suppressed in the vicinity of the second tilting groove portion 21B, thus enabling uneven wear to be suppressed.

In the above-described pneumatic tire, as illustrated in FIG. 3, a distance L1 in the tire width direction from the edge of the intermediate land 20 on the tire equator CL side to the bending portion apex of the bending groove 21 is set within a range of from 5% to 40% of the width W of the intermediate land 20. Also, a distance L2 in the tire width direction from the edge of the intermediate land 20 on the tire equator CL side to the closed end portion apex of the bending groove 21 is set within a range of from 30% to 70% of the width W of the intermediate land 20. Setting the distances L1, L2 within the above-described ranges enables the uneven wear suppression effect to be sufficiently achieved. Here, setting the distances L1, L2 outside the above-described ranges leads to an insufficient uneven wear suppression effect.

In the above-described pneumatic tire, the plurality of sipes 22 each extending between the center main groove 11 and the first tilting groove portion 21A may be provided in each of the intermediate lands 20, and at least one of the sipes is disposed for each first tilting groove portion 21A. Furthermore, the plurality of sipes 23 each extending between the shoulder main groove 12 and the closed end portion P3 of the second tilting groove portion 21B may be provided. Disposing the sipes 22, 23 at these positions provides an effect of averaging the rigidity of the intermediate lands 20 over the tire circumference, and enables improvements to the uneven wear suppression effect.

The respective groove depths of the sipes 22, 23 are set within a range of from 20% to 80% of the groove depth of the center main grooves 11. This enables the rigidity of the intermediate lands 20 to be appropriately adjusted. Here, having the respective groove depths of the sipes 22, 23 be less than 20% of the groove depth of the center main grooves 11 prevents a sufficient decrease in the rigidity, and conversely, having the respective groove depths exceed 80% excessively decreases the rigidity. Therefore, in either configuration, the uneven wear suppression effect is lowered.

In the above-described pneumatic tire, the plurality of lug grooves 31 extending in the tire width direction are preferably provided in each of the shoulder lands 30 located on the outer side of each of the shoulder main grooves 12. A ratio of the number of the bending grooves 21 to the number of the lug grooves 31 on the tire circumference is preferably 1:2. Accordingly, the rigidity of the shoulder lands 30 is averaged over the tire circumference, thus enabling uneven wear to be suppressed in the shoulder lands 30.

Also, when the lug grooves 31 are provided in the shoulder lands 30, all of the lug grooves 31 provided in the shoulder lands 30 are preferably non-continuous with respect to the shoulder main grooves 12. Accordingly, block portions defined by the lug grooves 31 in the shoulder lands 30 are thus prevented from collapsing in the tire circumferential direction, thus enabling heel-and-toe wear to be suppressed.

Figure 5:
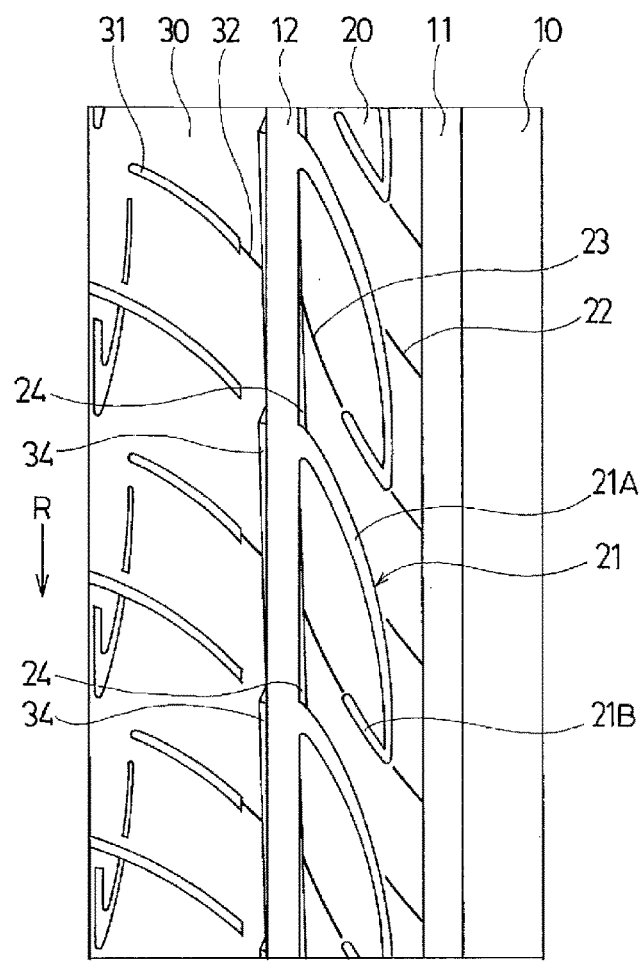
FIG. 5 is a plan view of the main portion, including chamfered portions, of the tread pattern of FIG. 2.

Furthermore, in the above-described pneumatic tire, as illustrated in FIG. 5, chamfered portions 24, 34 each having a zigzag shape are formed on the edge of the intermediate land 20 and the edge of the shoulder land 30, respectively, the edges being located on both sides of the shoulder main groove 12. That is, the chamfered portions 24 formed on the edge of the intermediate land 20 has a chamfered surface area that gradually increases from the one side (the top side in FIG. 5) toward the other side (the bottom side in FIG. 5) in the tire circumferential direction. The growth and reduction of the chamfered surface area is repeated in accordance with the pitch of the bending grooves 21. Conversely, the chamfered portions 34 formed on the shoulder land 30 has a chamfered surface area that gradually increases from the other side toward the one side. The growth and reduction of the chamfered surface area is repeated in accordance with the pitch of the bending grooves 21. As a result, the respective numbers of the chamfered portions 24, 34 that are formed on the intermediate lands 20 and the shoulder lands 30, respectively, equal to the number of the bending grooves 21.

Figure 6:
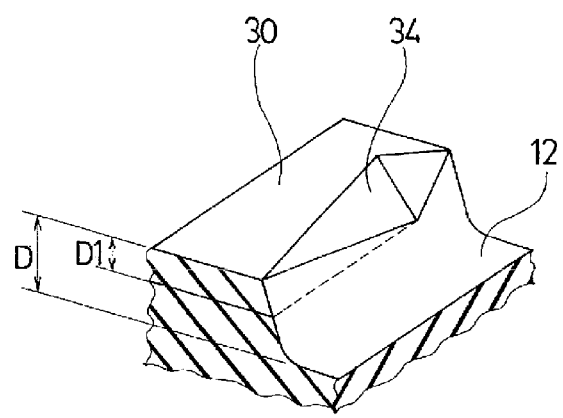
FIG. 6 is a perspective view of the chamfered portion formed in a shoulder land.

As illustrated in FIG. 6, the respective depths D1 of the chamfered portions 24, 34 are preferably set within a range of from 30% to 70% of the groove depth D of the shoulder main grooves 12. Providing the chamfered portions 24, 34 on the edges of the intermediate lands 20 and the shoulder lands 30 and optimizing the dimensions thereof as described above enables the rigidity of the intermediate lands 20 and the shoulder lands 30 to be averaged over the tire circumference, thus enabling uneven wear to be suppressed in the intermediate lands 20 and in the shoulder lands 30. Here, having the respective depths D1 of the chamfered portions 24, 34 be less than 30% of the groove depth D of the shoulder main grooves 12 prevents a sufficient decrease in the rigidity, and conversely, having the respective depths D1 exceed 70% excessively decreases the rigidity. Therefore, in either configuration, the uneven wear suppression effect is lowered.

EXAMPLES

Tires of Working Examples 1 to 9 were manufactured with a tire size of 215/45R17, as follows. Each of the tires includes a tread extending in the tire circumferential direction and forming an annular shape, a pair of sidewalls disposed on both sides of the tread, and a pair of beads disposed on the inner side of both of the sidewalls in the tire radial direction. The tread has a rib pattern that includes four main grooves extending in the tire circumferential direction, the four main grooves including a pair of center main grooves and a pair of shoulder main grooves, and five rows of lands extending in the tire circumferential direction, the five rows of lands being defined by the four main grooves, and the rotational direction of the pneumatic tire is designated. As illustrated in FIG. 2, a plurality of bending grooves each having a bent shape are provided in an intermediate land located on the inner side of each of the shoulder main grooves. Each of the bending grooves has one end portion thereof opening to the shoulder main groove and the other end portion closed in the intermediate land. A first tilting groove portion, extending from the opening end portion to the bending portion, and a second tilting groove portion, extending from the bending portion to the closed end portion, are formed in each of the bending grooves. A direction oriented from the opening end portion toward the bending portion of the first tilting groove portion coincides with the rotational direction. The second tilting groove portion is bent toward the first tilting groove portion, with the bending portion serving as an apex. Here, a pitch variation was applied to groove components including the bending grooves in order to vary the pitch along the tire circumference.

For Working Examples 1 to 9, the following parameters were set as per Table 1. The parameters include an average tilt angle α (in degrees) of the first tilting groove portion, an average angle β (in degrees) of the second tilting groove portion, a change in groove width and groove depth of the first tilting groove portion, a change in groove width and groove depth of the second tilting groove portion, a ratio of the length L1 of the bending portion to the width W of the intermediate lands (as a percentage), a ratio of the length L2 of the closed end portion to the width W of the intermediate lands (as a percentage), presence of a sipe extending between the center main groove and the first tilting groove portion (hereinafter, sipe A), a distance from the sipe A to a groove (in mm), a ratio of the groove depth of the sipe A to the groove depth of the center main groove (as a percentage), presence of a sipe extending between the shoulder main groove and the second tilting groove portion (hereinafter, sipe B), a distance from the sipe B to a groove (in mm), a ratio of the groove depth of the sipe B to the groove depth of the center main groove (as a percentage), a ratio of the number of the bending grooves to the number of the lug grooves in the shoulder lands, connectivity of the lug grooves in the shoulder lands to the shoulder main grooves, presence of a chamfered portion in the shoulder main grooves, and a ratio of the groove depth of the chamfered portion to the groove depth of the shoulder main grooves (as a percentage).

For comparison, a tire was prepared according to a conventional example. The tire was provided with a tilting groove (corresponding to the first tilting groove portion) replacing the bending groove in the intermediate land. Also, a tire was prepared according to Comparative Example 1, which is configured identically to Working Example 1 except that a direction oriented from the opening end portion toward the bending portion of the first tilting groove portion of the bending groove coincides with the reverse rotational direction.

Uneven wear resistance and in-vehicle noise performance after wear were evaluated on these test tires using the following evaluation methods. The results are presented in Table 1.

Uneven Wear Resistance:

Each test tire was assembled on a wheel having a rim size of 17×7J, inflated to an air pressure of 230 kPa, and mounted to a test vehicle having an engine displacement of 2.0 L (a rear-wheel drive vehicle). The test vehicle was driven for 10 laps on a circuit course that has a length of 6 km. Afterward, a degree of uneven wear was evaluated visually by each of 10 evaluators using a 10-point scale, and an average score was calculated. In terms of the evaluation, the conventional example was given a score of five points. A lower degree of uneven wear indicates better uneven wear resistance and is evaluated more highly.

In-Vehicle Noise Performance after Wear:

After the above-described driving test, the test tires were each mounted to the identical vehicle and a sensory evaluation pertaining to in-vehicle noise was performed by a professional driver. The evaluation results were based on a five-point scale, where the conventional example is given three points. A greater evaluation value signifies better in-vehicle noise performance after wear.

TABLE 1

|  | Conventional Example | Working Example 1 | Working Example 2 | Working Example 3 | Working Example 4 | Working Example 5 |
|---|---|---|---|---|---|---|
| Presence of Bending Groove | No | Yes | Yes | Yes | Yes | Yes |
| Tilting Direction of First Tilting Groove Portion | Rotational direction | Rotational direction | Rotational direction | Rotational direction | Rotational direction | Rotational direction |
| Average Tilt Angle α of First Tilting Groove Portion (°) | 15 | 15 | 25 | 15 | 15 | 15 |
| Average Tilt Angle β of Second Tilting Groove Portion (°) | — | 35 | 35 | 60 | 35 | 35 |
| Change in Groove Width of First Tilting Groove Portion | Gradual decrease | Gradual decrease | Gradual decrease | Gradual decrease | Constant | Gradual decrease |
| Change in Groove Depth of First Tilting Groove Portion | Gradual decrease | Gradual decrease | Gradual decrease | Gradual decrease | Constant | Gradual decrease |
| Change in Groove Width of Second Tilting Groove Portion | — | Constant | Constant | Constant | Constant | Constant |

TABLE 1-continued

|  |  |  |  |  |  |  |
|---|---|---|---|---|---|---|
| Change in Groove Depth of Second Tilting Groove Portion | — | Constant | Constant | Constant | Constant | Constant |
| Percentage of Bending Portion Distance L1 (%) | — | 30 | 30 | 30 | 30 | 10 |
| Percentage of Closed End Portion Distance L2 (%) | — | 50 | 50 | 50 | 50 | 60 |
| Presence of Sipe A | No | Yes | Yes | Yes | Yes | Yes |
| Distance from Sipe A to Groove (mm) | — | 0.5 | 0.5 | 0.5 | 0.5 | 0.5 |
| Percentage of Sipe A Groove Depth (%) | — | 65 | 65 | 65 | 65 | 65 |
| Presence of Sipe B | No | Yes | Yes | Yes | Yes | Yes |
| Distance from Sipe B to Groove (mm) | — | 0.5 | 0.5 | 0.5 | 0.5 | 0.5 |
| Percentage of Sipe B Groove Depth (%) | — | 65 | 65 | 65 | 65 | 65 |
| Ratio of Number of Bending Grooves to Number of Lug Grooves | 1:2 | 1:2 | 1:2 | 1:2 | 1:2 | 1:2 |
| Connectivity of Lug Grooves to Shoulder Main Grooves | Continuous | Non-continuous | Non-continuous | Non-continuous | Non-continuous | Non-continuous |
| Presence of Chamfered Portion | No | Yes | Yes | Yes | Yes | Yes |
| Percentage of Chamfered Portion Depth (%) | — | 50 | 50 | 50 | 50 | 50 |
| Uneven Wear Resistance (10-point scale) | 5 | 8 | 8 | 7 | 7 | 8 |
| In-vehicle Noise Performance After Wear | 3 | 5 | 5 | 4 | 4 | 5 |

|  | Working Example 6 | Working Example 7 | Working Example 8 | Working Example 9 | Working Example 10 | Comparative Example 1 |
|---|---|---|---|---|---|---|
| Presence of Bending Groove | Yes | Yes | Yes | Yes | Yes | Yes |
| Tilting Direction of First Tilting Groove Portion | Rotational direction | Rotational direction | Rotational direction | Rotational direction | Rotational direction | Reverse rotational direction |
| Average Tilt Angle α of First Tilting Groove Portion (°) | 15 | 15 | 15 | 15 | 15 | 15 |
| Average Tilt Angle β of Second Tilting Groove Portion (°) | 35 | 35 | 35 | 35 | 35 | 35 |
| Change in Groove Width of First Tilting Groove Portion | Gradual decrease | Gradual decrease | Gradual decrease | Gradual decrease | Gradual decrease | Gradual decrease |
| Change in Groove Depth of First Tilting Groove Portion | Gradual decrease | Gradual decrease | Gradual decrease | Gradual decrease | Gradual decrease | Gradual decrease |
| Change in Groove Width of Second Tilting Groove Portion | Constant | Constant | Constant | Constant | Constant | Constant |
| Change in Groove Depth of Second Tilting Groove Portion | Constant | Constant | Constant | Constant | Constant | Constant |

TABLE 1-continued

| | | | | | | |
|---|---|---|---|---|---|---|
| Percentage of Bending Portion Distance L1 (%) | 30 | 30 | 30 | 30 | 30 | 30 |
| Percentage of Closed End Portion Distance L2 (%) | 50 | 50 | 50 | 50 | 50 | 50 |
| Presence of Sipe A | Yes | Yes | Yes | Yes | Yes | Yes |
| Distance from Sipe A to Groove (mm) | 2.5 | 0.5 | 0.5 | 0.5 | 0.5 | 0.5 |
| Percentage of Sipe A Groove Depth (%) | 65 | 40 | 65 | 65 | 65 | 65 |
| Presence of Sipe B | Yes | Yes | Yes | Yes | Yes | Yes |
| Distance from Sipe B to Groove (mm) | 0.5 | 0.5 | 2.5 | 0.5 | 0.5 | 0.5 |
| Percentage of Sipe B Groove Depth (%) | 65 | 65 | 65 | 40 | 65 | 65 |
| Ratio of Number of Bending Grooves to Number of Lug Grooves | 1:2 | 1:2 | 1:2 | 1:2 | 1:2 | 1:2 |
| Connectivity of Lug Grooves to Shoulder Main Grooves | Non-continuous | Non-continuous | Non-continuous | Non-continuous | Non-continuous | Non-continuous |
| Presence of Chamfered Portion | Yes | Yes | Yes | Yes | Yes | Yes |
| Percentage of Chamfered Portion Depth (%) | 50 | 50 | 50 | 50 | 30 | 50 |
| Uneven Wear Resistance (10-point scale) | 9 | 8 | 9 | 8 | 6 | 4 |
| In-vehicle Noise Performance After Wear | 5 | 5 | 5 | 5 | 4 | 2 |

As Table 1 clearly shows, the tires of Working Examples 1 to 9 each have excellent uneven wear resistance with respect to circuit driving and have excellent in-vehicle noise performance after wear, in comparison to the Conventional Example. On the other hand, the tire of Comparative Example 1 did not produce effects of improving the uneven wear resistance and in-vehicle noise performance after wear, due to the direction oriented from the opening end portion toward the bending portion of the first tilting groove portion of the bending groove being the reverse rotational direction.

The invention claimed is:

1. A pneumatic tire comprising:
a tread extending in a tire circumferential direction and forming an annular shape;
a pair of sidewalls disposed on both sides of the tread; and
a pair of beads disposed on an inner side of both of the sidewalls in a tire radial direction, wherein
the tread has a rib pattern that includes:
at least four main grooves extending in the tire circumferential direction, the at least four main grooves including a pair of center main grooves and a pair of shoulder main grooves, and
at least five rows of lands extending in the tire circumferential direction, the at least five rows of lands being defined by the at least four main grooves; and
a rotational direction of the pneumatic tire is designated, and wherein
a plurality of bending grooves each having a bent shape are provided in an intermediate land located on an inner side of each of the shoulder main grooves;
each of the bending grooves has an end portion thereof opening to one of the shoulder main grooves and has an other end portion closed in one of the intermediate lands;
a first tilting groove portion extending from the opening end portion to a bending portion, and a second tilting groove portion extending from the bending portion to the closed end portion are formed in each of the bending grooves;
a direction oriented from the opening end portion toward the bending portion of the first tilting groove portion coincides with the rotational direction;
the second tilting groove portion is bent toward the first tilting groove portion with the bending portion serving as an apex;
an average tilt angle α of the first tilting groove portion with respect to the tire circumferential direction is set within a range of from 10° to 30°; and
an average tilt angle β of the second tilting groove portion with respect to the first tilting groove portion is set within a range of from 5° to 60°; and
the second tilting groove portion is disposed in an outer area in a tire width direction of the intermediate land sectioned by the first tilting groove portion.

2. The pneumatic tire according to claim 1, wherein a groove width of the first tilting groove portion is constant or gradually decreases from the opening end portion toward the bending portion.

3. The pneumatic tire according to claim 1, wherein a groove depth of the first tilting groove portion is constant or gradually decreases from the opening end portion toward the bending portion.

4. The pneumatic tire according to claim 1, wherein a groove width of the second tilting groove portion is constant from the bending portion toward the closed end portion.

5. The pneumatic tire according to claim 1, wherein a groove depth of the second tilting groove portion is constant from the bending portion toward the closed end portion.

6. The pneumatic tire according to claim 1, wherein a distance in a tire width direction from an edge of each of the intermediate lands on a tire equator side to an apex of the bending portion of each of the bending grooves is set within a range of from 5% to 40% of a width of the intermediate lands.

7. The pneumatic tire according to claim 1, wherein a distance in the tire width direction from an edge of each of the intermediate lands on a tire equator side to an apex of the closed end portion of each of the bending grooves is set within a range of from 30% to 70% of the width of the intermediate lands.

8. The pneumatic tire according to claim 1, wherein a plurality of sipes extending between the center main grooves and the first tilting groove portion are provided in each of the intermediate lands, and at least one of the sipes is disposed for each first tilting groove portion.

9. The pneumatic tire according to claim 1, wherein a plurality of sipes extending between the shoulder main grooves and the closed end portion of the second tilting groove portion are provided in each of the intermediate lands.

10. The pneumatic tire according to claim 9, wherein a groove depth of the sipes is set within a range of from 20% to 80% of a groove depth of the center main grooves.

11. The pneumatic tire according to claim 1, wherein a plurality of lug grooves extending in the tire width direction are provided in a shoulder land, the shoulder land being located on an outer side of each of the shoulder main grooves, and a ratio of a number of the bending grooves to a number of the lug grooves on a tire circumference is 1:2.

12. The pneumatic tire according to claim 11, wherein all of the lug grooves disposed in the shoulder lands are non-continuous with the shoulder main grooves.

13. The pneumatic tire according to claim 1, wherein chamfered portions having a zigzag shape are formed on edges of the intermediate lands and shoulder lands, the intermediate lands and the shoulder lands being located on both sides of the shoulder main groove, a number of the chamfered portions formed on each of the lands equals to a number of the bending grooves, and respective depths of the chamfered portions are set within a range of from 30% to 70% of a groove depth of the shoulder main grooves.

14. The pneumatic tire according to claim 1, wherein the average tilt angle $\alpha$ of the first tilting groove portion with respect to the tire circumferential direction is set within a range of from 10° to 25°.

15. The pneumatic tire according to claim 1, wherein the average tilt angle $\beta$ of the second tilting groove portion with respect to the first tilting groove portion is set within a range of from 35° to 60°.

16. The pneumatic tire according to claim 1, wherein the second tilting portion is shorter than the first tilting portion.

* * * * *